(12) United States Patent  
Yuan

(10) Patent No.: US 9,680,911 B2
(45) Date of Patent: Jun. 13, 2017

(54) METHOD AND APPARATUS OF SHORT UNIFORM RESOURCE LOCATOR LOOKUP AND FEEDBACK

(71) Applicant: TENCENT TECHNOLOGY (SHENZHEN) COMPANY LIMITED, Shenzhen, Guangdong (CN)

(72) Inventor: Changwen Yuan, Shenzhen (CN)

( * ) Notice: Subject to any disclaimer, the term of this patent is extended or adjusted under 35 U.S.C. 154(b) by 0 days.

(21) Appl. No.: 15/101,589

(22) PCT Filed: Feb. 13, 2015

(86) PCT No.: PCT/CN2015/072981
§ 371 (c)(1),
(2) Date: Jun. 3, 2016

(87) PCT Pub. No.: WO2015/090246
PCT Pub. Date: Jun. 25, 2015

(65) Prior Publication Data
US 2016/0308936 A1    Oct. 20, 2016

(51) Int. Cl.
*G06F 15/173*  (2006.01)
*G06F 15/16*  (2006.01)
(Continued)

(52) U.S. Cl.
CPC ........ *H04L 67/02* (2013.01); *G06F 17/30861* (2013.01); *H04L 63/10* (2013.01); *H04L 63/08* (2013.01)

(58) Field of Classification Search
CPC ................................ H04L 67/02; H04L 63/10
(Continued)

(56) References Cited

U.S. PATENT DOCUMENTS 7,698,269 B2 *  4/2010  Zhou ................. G06F 17/30887
                                                  707/999.006
8,381,276 B2 *  2/2013  Costinsky ............... H04L 67/02
                                                  726/6
(Continued)

FOREIGN PATENT DOCUMENTS

CN       102333082 A     1/2012
CN       103067389 A     4/2013

OTHER PUBLICATIONS

Weakley, Derek. "Short URL Security for Mobile Devices," Security Insight, Solutionary, Mar. 14, 2015.*
(Continued)

*Primary Examiner* — Melvin H Pollack
(74) *Attorney, Agent, or Firm* — Harness, Dickey & Pierce, P.L.C.

(57) ABSTRACT

A method of short uniform resource locator (URL) lookup and feedback of various examples may include: receiving a request related with a short URL associated with a target URL; identifying resource information of the short URL which is descriptive of credibility of network resources pointed to by the target URL; and making the resource information provided to a user. Another method of short URL lookup and feedback of various examples may include: receiving a request related with a long URL; identifying an identity of a website providing network resources pointed to by the long URL, the identity is a character string or a logo; generating a short URL which includes the identity; and making the short URL provided to the user.

19 Claims, 6 Drawing Sheets

(51) Int. Cl.
  *H04L 29/08* (2006.01)
  *H04L 29/06* (2006.01)
  *G06F 17/30* (2006.01)

(58) Field of Classification Search
  USPC .......................................................... 709/225
  See application file for complete search history.

(56) References Cited

U.S. PATENT DOCUMENTS

| | | | | |
|---|---|---|---|---|
| 8,661,161 | B2* | 2/2014 | Zhang | G06F 17/30876 709/206 |
| 8,838,767 | B2* | 9/2014 | Lakes | H04L 67/327 370/254 |
| 8,949,981 | B1* | 2/2015 | Trollope | G06F 21/50 709/224 |
| 9,058,490 | B1* | 6/2015 | Barker | G06F 21/564 |
| 9,160,696 | B2* | 10/2015 | Wilsher | H04L 12/287 |
| 9,210,229 | B2* | 12/2015 | McIntosh | H04L 67/02 |
| 9,218,482 | B2* | 12/2015 | Ma | G06F 17/3089 |
| 9,218,613 | B2* | 12/2015 | Dinardo, Sr. | H04W 4/206 |
| 9,241,044 | B2* | 1/2016 | Shribman | |
| 9,268,750 | B2* | 2/2016 | Mishra | G06F 17/2235 |
| 9,298,844 | B2* | 3/2016 | Graff | G06F 17/30899 |
| 9,319,292 | B2* | 4/2016 | Wyatt | H04L 63/20 |
| 9,384,345 | B2* | 7/2016 | Dixon | G06F 21/50 |
| 9,391,832 | B1* | 7/2016 | Song | H04L 29/14 |
| 9,392,007 | B2* | 7/2016 | Giokas | H04L 63/1416 |
| 9,392,014 | B2* | 7/2016 | Palumbo | H04L 63/145 |
| 9,411,900 | B2* | 8/2016 | Vishria | G06F 17/30887 |
| 9,436,770 | B2* | 9/2016 | Hattrup | G06Q 50/28 |
| 2010/0268739 | A1* | 10/2010 | Zalepa | G06F 17/30887 707/782 |
| 2011/0289434 | A1* | 11/2011 | Kieft | G06F 17/30887 715/760 |
| 2012/0047577 | A1 | 2/2012 | Costinsky | |
| 2012/0203929 | A1* | 8/2012 | Patalsky | G06F 17/30887 709/245 |
| 2012/0296918 | A1* | 11/2012 | Morris | G06F 17/30657 707/748 |
| 2013/0282714 | A1* | 10/2013 | Lathrom | G06F 17/30876 707/736 |
| 2013/0290821 | A1* | 10/2013 | Pollack | G06F 17/30887 715/208 |
| 2014/0122567 | A1* | 5/2014 | Suryavanshi | G06F 17/30887 709/203 |
| 2015/0025981 | A1* | 1/2015 | Zaretsky | G06F 17/30887 705/14.73 |
| 2015/0081419 | A1* | 3/2015 | Strutton | G06Q 30/0242 705/14.41 |
| 2015/0156162 | A1* | 6/2015 | Kaliski, Jr. | H04L 61/1505 709/203 |
| 2016/0248795 | A1* | 8/2016 | Chien | H04L 63/101 |
| 2016/0267060 | A1* | 9/2016 | Skirpa | G06F 17/218 |

OTHER PUBLICATIONS

Plaban, "How to Preview Shortened URLs (Bit.ly, Goo.gl, TinyURL) Before Clicking?" WebAdvices Tutorial, Apr. 11, 2013.*
Long, Joshua (Jostmeister), "How to Preview Shortened URLs (TinyURL, bit.ly, is.gd, and more)," The Joshmeister on Security, May 10, 2013.*
International Search Report and Written Opinion of the ISA for PCT/CN2015/072981, ISA/CN, Haidian District, Beijing, mailed May 15, 2015.

* cited by examiner

METHOD AND APPARATUS OF SHORT UNIFORM RESOURCE LOCATOR LOOKUP AND FEEDBACK

RELATED DOCUMENTS

The present disclosure is a national phase application of PCT/CN2015/072981 which claims priority of Chinese patent application No. 201310689025.2 titled "method, apparatus, server and system of short uniform resource locator presentation and feedback" and filed on Dec. 16, 2013 with the Patent Office of the People's Republic of China, the disclosure of which is incorporated by reference in its entirety.

TECHNICAL FIELD

The present disclosure relates to computer and Internet data processing techniques, and particularly, to a method and an apparatus of short uniform resource locator (URL) lookup and feedback.

BACKGROUND

At present, with development of Internet technology, the Internet has become an important source of information for people. Webpage contents are generally propagated among users in the form of URLs. A URL is a standard address of resources on the Internet, and is a concise representation of the location and access method of resources accessible from the Internet. Each file on the Internet has a respective unique URL. Information in the URL specifies the location of the file and how a browser should handle the file. Generally, a regular URL is in a format of scheme://host:port/path.

A regular URL, however, may be very long, and short URLs are thus proposed. A short URL refers to a short link mapped from a long URL, and is generally in a format of http://shortdomain/urlid. The shortdomain is the domain name of the short URL, and the urlid is the identifier of the short URL.

SUMMARY

Embodiments of the present disclosure provide a method, an apparatus and a storage medium of short URL lookup and feedback, to provide users with credibility information of network resources pointed to by a target URL of a short URL.

A method of short URL lookup and feedback may include:
receiving a request related to a short URL which is associated with a target URL;
identifying resource information of the short URL which is descriptive of credibility of network resources pointed to by the target URL; and
making the resource information provided to a user.

A method of short URL lookup and feedback may include:
receiving a request related with a long URL;
identifying an identity of a website which provides network resources pointed to by the long URL, the identity is a character string or a logo;
generating a short URL which includes the identity; and
making the short URL provided to a user.

An apparatus of short URL lookup and feedback may include:

a storage module, for storing resource information corresponding to short URLs;
a lookup module, for receiving a request related with a short URL which is associated with a target URL; identifying resource information of the short URL in the storage module, the resource information is descriptive of credibility of network resources pointed to by the target URL; making the resource information provided to a user.

An apparatus of short URL lookup and feedback may include:
a storage module, for storing an identity of a website which is a character string or a logo; and
a lookup module, for receiving a request related with a long URL; identifying an identity of a website providing network resources pointed to by the long URL in the storage module; generating a short URL which includes the identity; and making the short URL provided to a user.

A non-transitory storage medium stores computer-readable instructions capable of causing a computer to perform the following actions:
receiving a request related to a short URL which is associated with a target URL;
identifying resource information of the short URL which is descriptive of credibility of network resources pointed to by the target URL; and
making the resource information provided to a user.

A non-transitory storage medium stores computer-readable instructions capable of causing a computer to perform the following actions:
receiving a request related with a long URL;
identifying an identity of a website providing network resources pointed to by the long URL, the identity is a character string or a logo;
generating a short URL which includes the identity; and
making the short URL provided to a user.

Various embodiments of the present disclosure add an identity of a website which provides a target webpage into a short URL when generating the short URL and provide the short URL to a user to enable the user to directly know the credibility of the target webpage pointed to by the short URL. The user may click on the short URL to visit the webpage only when displayed is webpage authentication information familiar to the user. Various embodiments of the present disclosure also provide lookup of short URL, and provide resource information which is descriptive of credibility of a target URL to a user. Thus, the user may know the credibility of the target webpage from the resource information of the target webpage.

BRIEF DESCRIPTION OF THE DRAWINGS

Features of the present disclosure are illustrated by way of example and not limited in the following figures, in which like numerals indicate like elements, in which.

DETAILED DESCRIPTIONS

For simplicity and illustrative purposes, the present disclosure is described by referring mainly to an example thereof. But not all examples are shown. Indeed, the technical mechanism may be embodied in many different forms and should not be construed as limited to the examples set forth herein. Rather, these examples are provided so that this disclosure will satisfy applicable legal requirements. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the term "includes" means includes but not limited to, the term "including" means including but not limited to. The term "based on" means based at least in part on. Quantities of an element, unless specifically mentioned, may be one or a plurality of, or at least one.

Figure 1:
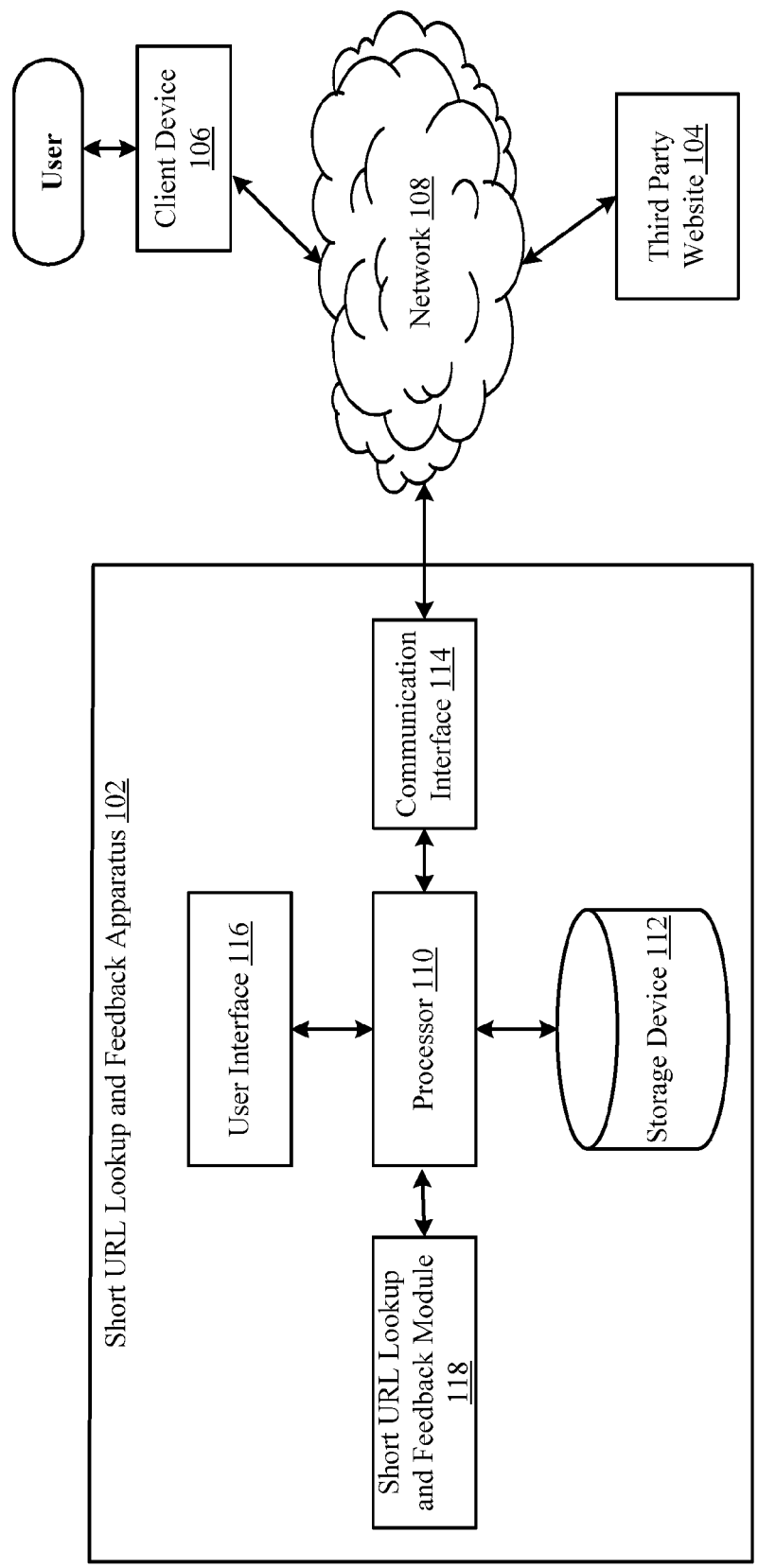
FIG. 1 is a schematic diagram illustrating a system of short URL lookup and feedback.

FIG. 1 is a schematic diagram illustrating a system of short URL lookup and feedback. FIG. 1 is merely an example of the present disclosure, and other examples may be implemented in different system structures.

The "resource information" as used herein refers to information descriptive of credibility of network resources pointed to by a target URL corresponding to a short URL, based on which a user may decide whether to access the network resources. For example, "resource information" may be descriptive information of a website which provides the network resources pointed to by the target URL, or introduction information of network resources pointed to by the target URL, or social networking traffic information generated by other people visiting the network resources or the website, comments of another web service provider about the network resources or the website, or the like. The social networking traffic information may include, within a social networking platform, the amount of visits to the target URL, the amount of clicks on the target URL, the amount of forwarding of the target URL, the amount of likes of the target URL, the amount of adding the target URL to favorites, the amount of complaints against the target URL, or the like. In an example, the resource information may be digitally stored as a data object in a fixed format which can be delivered between plural network devices (e.g., via a certain message) or stored in a storage device of a network device.

As shown in FIG. 1, the system may include an apparatus 102 of short URL lookup and feedback, a third party website 104 and a client device 106, which are capable of communicating with each other through a network 108. The apparatus 102 may be any computing device or plural computing devices capable of providing short URL lookup and feedback services to a user of a remote device (e.g., the client device 106) via the network 108. In an example, the apparatus 102 may be implemented by one or plural servers, e.g., a server cluster or a blade server array. Likewise, the third party website 104 may also be any computing device or plural computing devices, and may be implemented by one or plural servers. The third party website 104 may provide any type of network resources (e.g., webpages, resource downloading, e-commerce, online game, or the like) to users of a remote device (e.g., client device 106) via the network 108. The third party website 104 may be configured to provide the apparatus 102 with credibility information of the third party website 104, e.g., name, domain name, type, website logo, text introduction, traffic statistics, user statistics, qualification certificate, or the like, of the website. The client device 106 may be any computing device capable of communicating with the apparatus 102 via the network 108 to obtain a short URL lookup response. The short URL lookup response may include resource information of a short URL specified in a lookup request sent by the client device 106, or a short URL generated by the apparatus 102 for a long URL in a lookup request sent by the client device 106, or the like.

Figure 2:
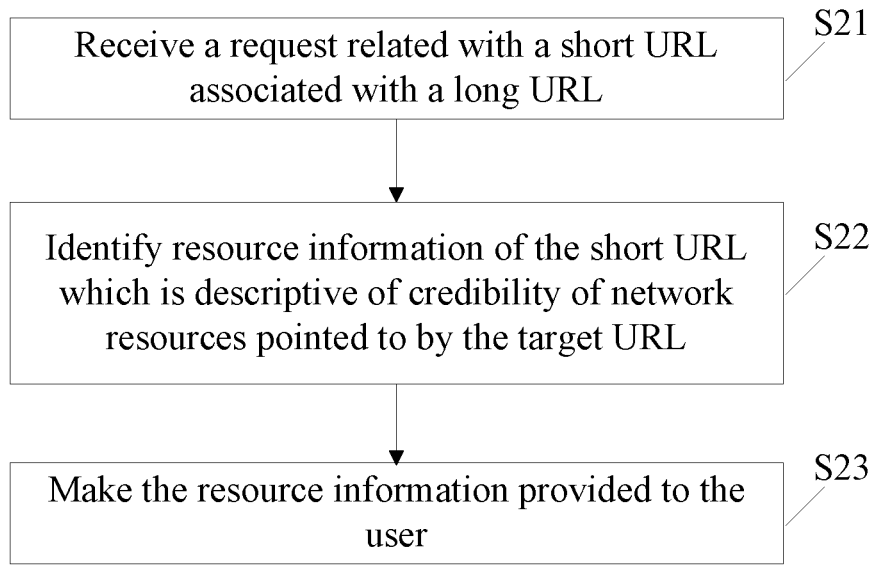
FIG. 2 is a flowchart illustrating a method of short URL lookup and feedback.

FIG. 2 is a schematic diagram illustrating a system of short URL lookup and feedback in accordance with an example of the present disclosure. As shown in FIG. 2, the method may include the following procedures.

In procedure S21, an apparatus 102 of short URL lookup and feedback may receive a request related with a short URL which is associated with a target URL.

In procedure S22, the apparatus 102 may identify resource information of the short URL which is descriptive of credibility of network resources pointed to by the target URL.

In procedure S23, the apparatus 102 may make the resource information provided to a user.

In an example, the apparatus 102 may receive a request sent by a remote device (e.g., the client device 106) through the network 108, and the request may include a short URL. In an example, the request may also specify the request is for resource information of the short URL in an explicit or inexplicit manner. For example, the request may include a mark indicating resource information lookup, or a type field in the request may be set to be a pre-determined value which indicates resource information lookup. For example, when detecting a pre-determined operation performed by a user on the short URL, e.g., a mouse-over event, or the like, the client device 106 may send a request to the apparatus 102 to lookup resource information of the short URL.

In an example, the apparatus 102 may receive website descriptive information provided by the third party website 104 through the network 108. The website descriptive information is descriptive of credibility of a website, e.g., name, domain name, website logo, type, text introduction, traffic statistics, user statistics, or the like, of the website. Generally, a vicious website will not proactively provide such website descriptive information. In an example, the third party website 104 may generate website descriptive information in a pre-determined format according to pre-determined configuration information, and provide the website descriptive information to the apparatus 102 via a message. The apparatus 102 may check validity of the website descriptive information by providing the website descriptive information to an administrator or processing the website descriptive information using a pre-determined rule (e.g., a pre-determined white list or black list of websites), and store website descriptive information whose validity has been testified so as to provide the website descriptive information to a user in the future. In another example, the apparatus 102 may obtain descriptive information of a website from configuration information pre-determined by an administrator. For example, the administrator may set up a white list of websites, and provide the apparatus 102 with descriptive information of credible websites as a configuration file.

In an example, the apparatus 102 may obtain statistics data which is generated by another web service provider according to traffic to the network resources or to the website, e.g., the amount of visits to the short URL, the amount of clicks on the short URL, the amount of forwarding of the short URL, the amount of likes of the short URL, the amount of adding the short URL into favorites, the amount of complaints against the short URL, or the like, or traffic to the website which provides the network resources, the amount of clicks on the website, the amount of complaints against the website, or the like. In an example, the apparatus 102 may receive website descriptive information provided by the third party website 104 through the network 108. In an example, when the apparatus 102 is applied to a web service platform, the apparatus 102 may access a database of the web service platform according to configurations to obtain the statistics data. For example, when the apparatus 102 is applied in a social networking platform, the apparatus 102 may access user traffic statistics data of the social networking platform (also referred to as social networking traffic data). In an example, the apparatus 102 may receive comments information about the network resources or the website from another web service provider through the network 108. The comments information may include information representing credible, incredible, risky, or the like. In an example, the comments information may be an authentication result of the short URL obtained by a web service provider. The authentication result may indicate a review result of credibility of the short URL obtained by the web service provider. For example, when the apparatus 102 is applied to the social networking platform, the apparatus 102 may access authentication information of the website or of the network resources obtained by an operator of the social networking platform according to configurations, or receive the authentication information from the social networking platform.

In an example, the apparatus 102 may also obtain introduction information of the network resources via the network 108 as the resource information. The introduction information of the network resources may include a title, a summary, a publication data, information source, or the like. In an example, the apparatus 102 may also obtain abstract information of the network resources from the network 108 using a webcrawler software as the resource information.

The above are merely a few examples of methods of obtaining resource information for facilitating understanding. Other examples may use different methods to obtain different forms of resource information.

In an example, the apparatus 102 may identify statistics data or comment information of the short URL obtained by a service provider from resource information obtained according to the above methods based on the short URL specified in a received request; and/or identify the website providing the network resources according to the target URL corresponding to the short URL, and identify description information of the website, statistics data or comment information obtained by a service provider regarding the website, and/or identify introduction information of the network resources according to the target URL, or the like.

In an example, the apparatus 102 may provide the resource information corresponding to the short URL to a remote device, e.g., client device 106, via the network 108. In an example, the apparatus 102 may provide the remote device with all of resource information corresponding to the short URL. In other examples, the apparatus 102 may provide the remote device with a selected portion of the resource information according to pre-determined configuration information or according to a request from the remote device. For example, after determining the website is in a pre-determined list of famous websites, the apparatus 102 may only provide the website name, website logo, introduction information of the network resources, or the like. If it is determined the website is not in the list of famous websites, the apparatus 102 may provide more detailed resource information, e.g., website name, website domain name, website logo, website type, text introduction, traffic statistics data, user statistics data, statistics data or comment information or network resources introduction information obtained by another web service provider regarding the website or of the network resources, or the like. The above are merely examples, and other examples may select or define the type and amount of resource information to be provided based on different situations.

In an example, the apparatus 102 may have the resource information presented to a user, e.g., making a viewing module in a display device present the resource information. The display device may be the remote device (e.g., the client device 106), or may be any device with displaying capabilities and capabilities of communicating with the remote device. In an example, the viewing module may be a web browser capable of sending or receiving data with the apparatus 102 via the network 108. The data sent or received may include, for example, a lookup request for a short URL, a webpage, resource information, or the like. In another example, the viewing module may be a special-purpose application (e.g., a standalone application, a programmed script, or the like) which runs in the client device 106 and provides a user interface displaying the short URL and related resource information. The viewing module may be implemented in any manner, e.g., hardware, software, firmware, or any combination thereof. In another example, the viewing module may be a web application accessible by the client device 106. The web application may be embodied as a series of instructions which are stored in a storage device and executable by a processor. In an example, the viewing module may be implemented by the apparatus 102. The viewing module may display the resource information in various forms in a display device, e.g., in a floating window, in a popup window, or in a bubble window, or the like.

In an example, the apparatus 102 may receive a second request which is related with a long URL. The second request is for a short URL corresponding to the long URL. The apparatus 102 may determine an identity of a website providing network resources pointed to by the long URL, which may be a character string or a logo; generate a short URL which includes the identity; and make the short URL provided to a user. In an example, the apparatus 102 may take the character string as one of the following: a prefix of the domain name of the short URL, a sub domain name or a directory name of the short URL.

Figure 3:
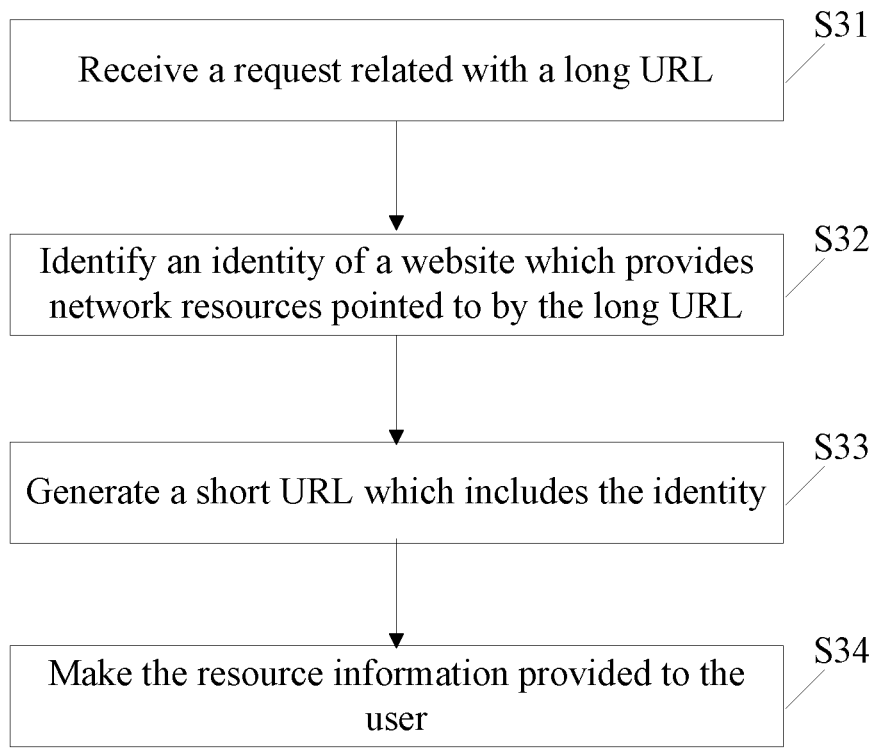
FIG. 3 is a flowchart illustrating a method of short URL lookup and feedback.

FIG. 3 is a schematic diagram illustrating a system of short URL lookup and feedback in accordance with an example of the present disclosure. As shown in FIG. 3, the method may include the following procedures.

In procedure S31, the apparatus 102 may receive a request related with a long URL.

In procedure S32, the apparatus 102 may identify an identity of a website which provides network resources pointed to by the long URL, and the identity may be a character string or a logo.

In procedure S33, the apparatus 102 may generate a short URL which includes the identity.

In procedure S34, the apparatus 102 may make the resource information provided to a user.

In an example, the apparatus 102 may receive a request sent by a remote device (e.g., a client device 106) through the network 108, and the request may include a long URL, i.e., a regular URL. In an example, the request may also specify the request is for acquiring the short URL corresponding to the long URL in an explicit or inexplicit manner. For example, the request may include a mark indicating acquiring short URL, or a type field in the request may be set to be a pre-determined value which indicates acquiring short URL. For example, when detecting a pre-determined operation performed by a user on the long URL, e.g., the user inputs the long URL into a text input box, or the like, the client device 106 may send a request to the apparatus 102 to lookup the short URL corresponding to the long URL.

In an example, the apparatus 102 may obtain the identity of the website from a pre-defined configuration file. In an example, the apparatus 102 may receive the identity of the website provided by a third party website 104 through the network 108. The third party website 104 may determine the length of a character string or the size of a logo of the identity of the website according to pre-determined configuration information. Since the logo is used in a short URL, it may be pre-defined that the length of the character string is between 1 to 5. The types of characters allowed to be included in the character string may be configured, e.g., symbols, capital letters, small letters, digits, or the like.

In an example, the apparatus 102 may take the character string as one of the following: a prefix of the domain name of the short URL, a sub domain name or a directory name of the short URL. For example, when the website identity is "qq", the short URL generated by the apparatus 102 may be http://qq.url.cn/MnQ6, or http://url.cn/qq/MnQ6, or http://url.cn/MnQ6/qq, or the like. When the website identity is a logo, the apparatus 102 may generate a short URL using any method, and sending the logo as part of the short URL to the remote device together with the short URL. The apparatus 102 may make the logo displayed by the side of the short URL via a viewing module of a display device, e.g., on the left side of the short URL, or on the right side of the short URL, or the like.

As shown in FIG. 1, the apparatus 102 may include various implementation manners, e.g., a processor 110, a storage device 112, a communication interface 114, a user interface 116 and a short URL lookup and feedback module 118, to fulfill various functions described herein. The various implementation manners may include, for example, hardware modules (e.g., programmable processor, logic circuits, or the like), computer-executable codes (e.g., software or firmware) in a computer-readable storage medium (e.g., storage device 112), or the combination thereof. The computer-executable codes may be executed by a properly programmed processing device (e.g., processor 110). The processor 110 may be implemented in various forms, e.g., microprocessor, co-processor, controller, or other processing devices including integrated circuit, e.g., ASIC or FPGA. In an example, the processor 110 may be configured to execute instructions in storage device 112 or accessible in other manners. Although FIG. 1 shows one processor, the processor 110 may include plural processors operating in parallel, e.g., a multi-computer system. The processors may be deployed in a single computing device, or distributed in plural computing devices, e.g., in a server cluster.

The storage device 112 may include, for example, transitory storage device and/or non-transitory storage device. The storage device 112 may be configured to store information, data, applications, instructions, or the like, and capable of causing the apparatus 102 to implement functions of various examples. For example, the storage device 112 may cache input data to be processed by the processor 110. For example, the storage device 112 may store instructions to be executed by the processor 110. The storage device 112 may include one or plural databases for storing static and/or dynamic data. Therefore, the storage device 112 may store, e.g., descriptive information of a website, statistics data and/or comment information obtained by another web service provider regarding the website or the short URL, introduction information of network resources, mapping relations between the short URL and the long URL, or the like. The stored data may be stored and/or used by the short URL lookup and feedback module 118 when implementing the functions of various examples.

The communication interface 114 may be implemented by various devices or various measures, e.g., hardware, software, firmware, or any combination thereof. The communication interface 114 may send/receive data to/from the network (e.g., the network 108) or another device (e.g., the third party website 104 and/or client device 106), to implement communication functions of the apparatus 102. In an example, the communication interface 114 may be partly or fully controlled by the controller 110. The communication interface 114 may include, for example, an antenna, a transceiver, an Ethernet interface, or other hardware or software capable of communicating with another device in the system (e.g., the third party website 104 and/or client device 106). The communication interface 114 may be configured to enable the apparatus 102 to receive and/or send data from/to other computing devices (e.g., the third party website 104 and/or the client device 106) via any protocol through the network 108. The communication interface 114 may also communicate with the storage device 112, the user interface 116 and/or the short URL lookup and feedback module 118 via a device such as a bus, or the like.

The user interface 116 may communicate with the processor 110 to receive user input and provide output information to the user. The user interface may include, for example, keyboard, mouse, display, touch screen, speaker, microphone, and/or other input/output mechanisms. In an example, when the apparatus 102 is implemented by a server, the user interface may be simplified or omitted. The user interface 116 may also communicate with the storage device 112, the communication interface 114 and/or the short URL lookup and feedback module 118 via a device such as a bus, or the like.

The short URL lookup and feedback module 116 (simply referred to as lookup module) may be implemented by various mechanisms, e.g., hardware, software, firmware, or any combination thereof. In an example, the lookup module 118 may be implemented or controlled by the processor 110. In an example, the lookup module 118 may be a standalone module capable of communicating with the processor 110. The lookup module 118 may be configured to receive, process and send data and information related with the above short URL lookup and feedback service. The lookup module 118 may manage and store (e.g., in the storage device 112) a long URL corresponding to a short URL, resource information of network resources. Correspondingly, the lookup module 118 may implement functions of the above apparatus 102, to enable a user to create a short URL corresponding to a long URL or to obtain resource information of a short URL.

The technical mechanism is applicable to any web information service processing system, e.g., a social networking platform such as a microblog system, or a processing system providing other web information services such as a website system, an Internet instant messaging system, an email system, or the like. The following examples may take a microblog system as an example in illustration.

Figure 4:
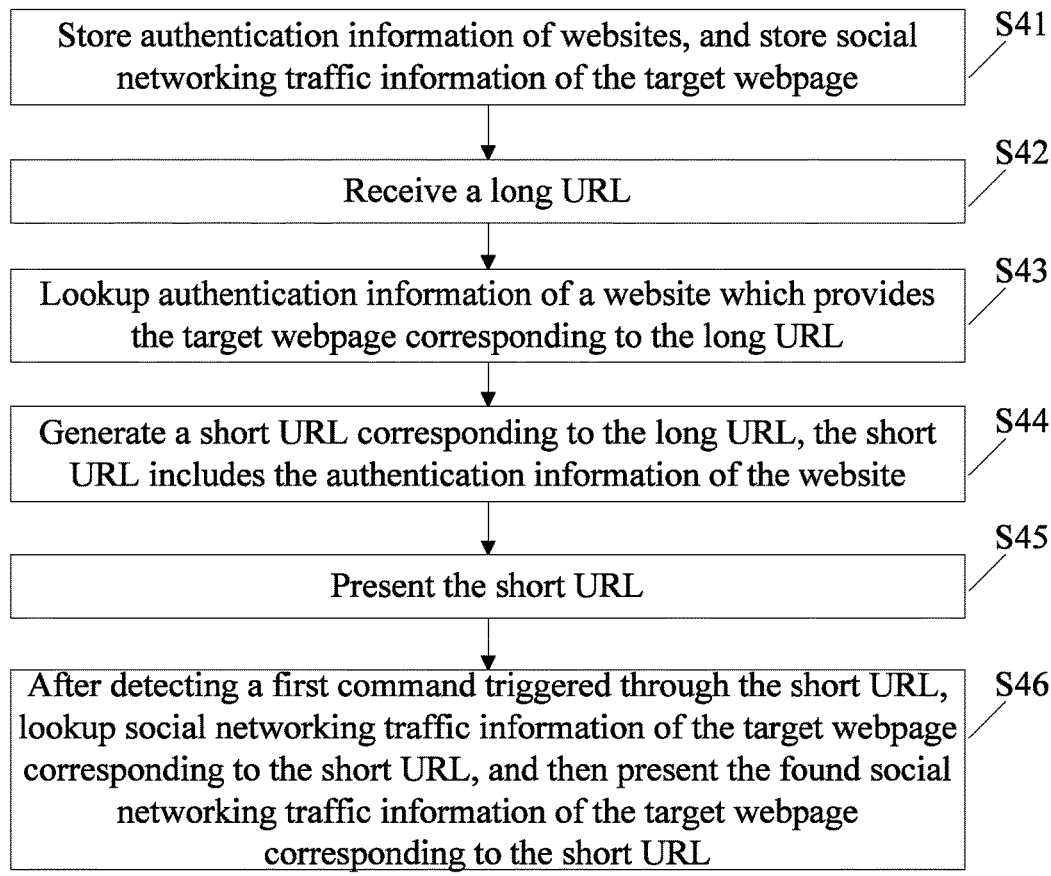
FIG. 4 is a flowchart illustrating a method of presenting a short URL in accordance with an example of the present disclosure.

FIG. 4 is a schematic diagram illustrating a system of short URL lookup and feedback in accordance with an example of the present disclosure. As shown in FIG. 4, the method may include the following procedures.

In procedure S41, authentication information of a website (i.e., descriptive information of the website) may be stored, and social networking traffic data of the target webpage may be stored.

The authentication information of the website may be inputted by a device of each website via a specified input interface (e.g., a webpage for submitting authentication information). The authentication information may include, such as, website domain name, website logo, website identifier, website qualification certificate. The owner of the website may use information familiar to users as the authentication information of the website. After receiving the authentication information, the system of various examples may temporarily store the authentication information for examination by an administrator, and store the authentication information permanently after the authentication information passed the examination and became effective. As such, the technical mechanism can avoid intentional fraud by the owner of the website, and ensure reliability of target webpages. The authentication information of websites is generally stored in an authentication database, and the social networking traffic data is stored in a social networking traffic database. The databases may be implemented by, for example, the storage device 112. When the apparatus 102 of short URL lookup and feedback is implemented by a server of a web service platform (e.g., a social networking platform), the authentication information may include comment information, e.g., a certification mark, provided by the provider of the short URL (i.e., the web service platform). The certification mark may be an image, a logo, or the like. For example, if a certification mark of the system is added after authentication information provided by a device of the website passed examination by the administrator of the system, the certification mark represents the website has passed authentication of the system and is highly safe.

In an example, besides manual authentication by an administrator, the authentication information of the website may pass through automatic authentication. The automatic authentication may include the following procedures A to C.

In procedure A, traffic data to the website and complaint data against the website may first be obtained. The traffic data and complaint data may be directly obtained from related systems. For example, a conventional microblog platform may provide a statistics server for counting the number of visits from users and keeping a journal of complaints generated when the web address is propagated in the microblog platform, and the traffic data and complaint data of the website may be directly obtained from the statistics server.

In procedure B, for each website whose authentication information is inputted via the input interface, a complaint ratio of the website within a latest time period, e.g., the passed month, the passed week, or the like, may be calculated. The complaint ratio may be calculated according to: calculating the proportion of the number of complaints from users after duplicate removal to the number of visits from users after duplicate removal. The higher the complaint ratio of a website is, the lower the reliability of the website is.

In procedure C, it may be judged whether the complaint ratio of each website whose authentication information was submitted exceeds a threshold, and authentication information of the website may be deleted or suspended if the complaint ratio of the website exceeds the threshold, or the authentication information of the website becomes effective and is permanently stored if the complaint ratio of the website does not exceed the threshold. The suspension of authentication information refers to the authentication information is in a state of being invalid, i.e., the short URL generated in subsequent procedures corresponding to a long URL of the website does not include the authentication information of the website.

The automatic authentication process including the procedures A to C may be executed at intervals to timely identify websites with abnormal complaint ratios and delete and ban the authentication information of such websites to reduce the risks of users.

The social networking traffic data of the target webpage may include social networking traffic data generated in a social networking platform, e.g., in a microblog platform regarding the target webpage. The social networking traffic data may include data on traffic, clicks, forwarding, complaints, or the like, of the target webpage. For a new visitor of the UGC system, the social networking traffic data may reflect how the target webpage is perceived by other users or friends in a user generated content (UGC) system. The user can thus make a judgment as to whether to continue visiting the target webpage. As such, the reliability of the website can be further testified, and the brand effect of the website can be enhanced.

The social networking traffic information of the target webpage may be obtained from a conventional system. For example, a conventional microblog platform may provide a statistics server which calculates data on traffic, clicks, forwarding, complaints, or the like, of the target webpage, and the social networking traffic information of the target webpage may be directly obtained from the statistics server and then stored for use in subsequent procedures.

In procedure S42, a long URL may be received.

For example, when a user sends a microblog, the user may input a regular URL of a target webpage, i.e., the long URL, if the user wants to put out the URL of the target webpage. For example, the user may paste a copied long URL into the page for submitting contents. After clicking on a button for submitting contents, contents of the microblog sent by the user may be submitted to the microblog system, and the system may receive the contents of the microblog which includes the long URL.

In procedure S43, authentication information of the website providing the target webpage corresponding to the long URL is looked up.

The authentication information may also be referred to as a website identity, and may be a character string. A long URL is generally composed of: a mode (or protocol), a domain name (or server name or IP address), a path and a file name, e.g., "protocol://domain name/path". The domain name or server name or IP address specifies the website providing the target webpage. Various examples may identify the website providing the target webpage corresponding to the long URL using the domain name or server name or IP address or other equivalent identity, and search the authentication information stored in procedure 201 for the authentication information of the website. For example, supposing the authentication information of website A is a website identifier aaa, if the target webpage corresponding to the long URL inputted by the user belongs to website A, the authentication information found out in this procedure may be aaa. The authentication information may also be the website logo, website domain name, or the like.

In procedure S44, a short URL corresponding to the long URL may be generated, the short URL may include the authentication information of the website which provides the target webpage corresponding to the long URL.

In this procedure, the long URL may first be converted into a short URL according to a conventional method, then the authentication information found in procedure 203 may be added into the short URL so that the short URL includes the authentication information of the website providing the target webpage corresponding to the long URL.

Figure 5:
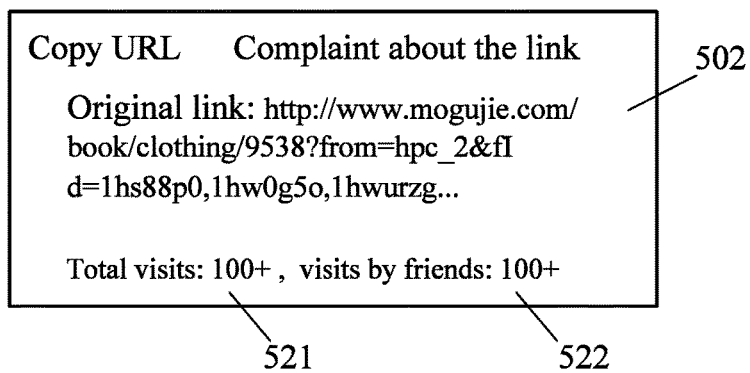
FIG. 5 is a schematic diagram illustrating a user interface presenting a short URL in accordance with an example of the present disclosure.
Figure 6:
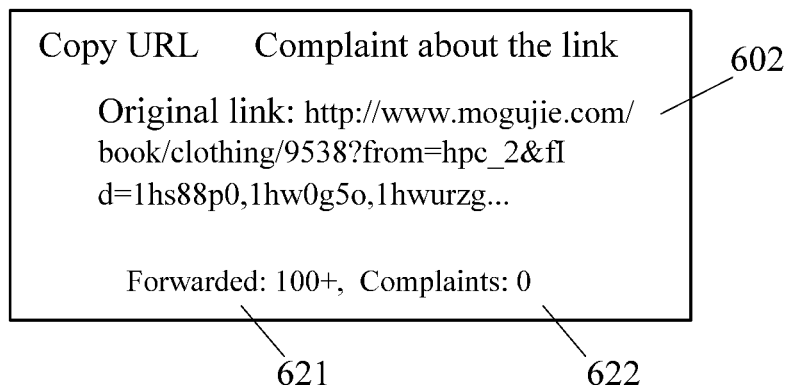
FIG. 6 is a schematic diagram illustrating a user interface presenting a short URL in accordance with an example of the present disclosure.

For example, a long URL "http://www.mogujie.com/book/clothing/9538?from=hpc_2&fId=1hs88p0,1hw0g5o,1hwurzg" may be converted into a short URL http://url.cn/MiTbRj according to a conventional method. Supposing the authentication information found in procedure S43 is aaa, the short URL generated may be: http://url.cn/aaa/MiTbRj, see the short URL 501 as shown in FIG. 5. The position of the authentication information aaa in the short URL is not limited herein, e.g., the short URL may be http://aaa.url.cn//MiTbRj, or aaa. http://url.cn/aaa/MiTbRj. Recommendation information may be added in addition to the authentication information, e.g., http://url.cn//MiTbRj (aaa recommended) where the "aaa recommended" is the recommendation information. The authentication information may also be the website logo, and the website logo may be added ahead of the short URL http://url.cn//MiTbRj to form the short URL of various examples of the present disclosure, see the short URL formed by the logo 601 and http://url.cn//MiTbRj as shown in FIG. 6.

After being generated, the short URL may replace the long URL in the contents submitted by the user so as to make the contents meet the word count requirements of the microblog system. The mapping relation between the long URL and the short URL may be stored, e.g., in a web address database.

In procedure S45, the short URL may be presented.

This procedure may be triggered where only the short URL is presented when a user browses a webpage including a URL. For example, when a user is browsing a microblog including a URL in a microblog system, only a short URL may be presented due to the system has a word count requirement. As such, a short URL with authentication information is presented to the user, and the user can directly know that the target webpage corresponding to the short URL is an authenticated website, thus can make a decision on whether to click on it based on the information, and the chance of clicking on a short URL pointing to a vicious website can be reduced.

In procedure S46, after detecting a first command triggered through the short URL, social networking traffic information of the target webpage corresponding to the short URL may be found out and presented. The target webpage corresponding to the short URL refers to the target webpage pointed to by the long URL corresponding to the short URL, i.e., the short URL is mapped to the same target webpage with the long URL.

If the terminal used by the user is a computer with a mouse, the first command may be a mouseover event triggered by moving the mouse over the short URL. If the terminal used by the user is a portable terminal with a touch screen, the first command may generally be a touch event triggered by a first touch on the short URL by the user. In other examples, the first command may also be other specified operation commands.

The procedure of searching for the social networking traffic information of the target webpage corresponding to the short URL may include: searching the social networking traffic information of the target webpage stored in procedure S41 for the social networking traffic information of the target webpage, e.g., data on traffic, clicks, forwarding, complaints, or the like, of the target webpage.

As shown in FIG. 5, when it is detected that the mouse is moved over the short URL, the lookup procedure may be triggered to obtain the social networking traffic information of the target webpage, and a display box 502 may be popped up by the side of the short URL. The display box 502 may present the social networking traffic information of the target webpage, e.g., data on traffic, clicks, forwarding, complaints, or the like, of the target webpage. In the example of FIG. 5, displayed includes the total visits 521 and visits 522 from friends in the microblog system.

In the example of FIG. 6, when it is detected the mouse is moved over the short URL, the lookup procedure may be triggered to identify social networking traffic information of the target webpage, and a display box 602 may be popped up by the side of the short URL. The display box 602 may present the social networking traffic information of the target webpage. In the example of FIG. 6, displayed includes the number of forwarding 621 of the target webpage in recent days and the number of complaints 622.

The social networking traffic information may include information about the target webpage being visited in the social network, which can further testify the reliability of the authentication information associated with the target webpage. Therefore, the user may make further judgment based on the social networking traffic information. If the social networking traffic information confirms that the target webpage has low reliability, the user may choose not to click on the short URL. As such, the chance of short URLs pointing to vicious websites being clicked on can be reduced, safety of users browsing short URLs can be increased, and risks of virus infection or user privacy leakage or the like can be reduced.

Figure 7:
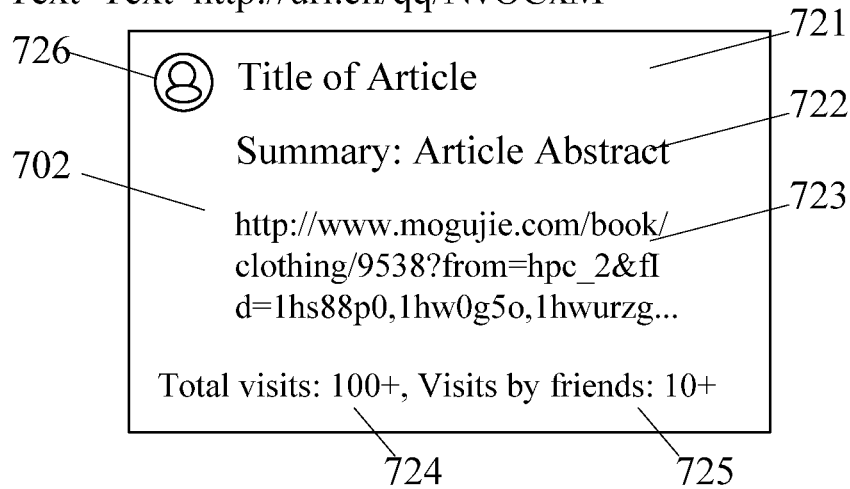
FIG. 7 is a schematic diagram illustrating a user interface presenting introduction information of a target webpage after detecting a first command in accordance with an example of the present disclosure.

In an example, in procedure S41, brand information of the website, introduction information of the target webpage, or the like may also be submitted and stored. The information may be submitted by a device of the website. Various examples may store the inputted introduction information, such as website brand information, target webpage introduction, or the like. The website brand information may include: a website logo, a website brief introduction, or the like. The target webpage introduction may include: a title, a summary of the text of the webpage, or the like. In procedure S46, after detecting the first command triggered through the short URL, introduction information of the target webpage corresponding to the short URL may be found out and presented. FIG. 7 is a schematic diagram illustrating a user interface presenting introduction information of a target webpage after detecting a first command in accordance with an example of the present disclosure. As shown in FIG. 7, the authentication information "qq" 701 of the website providing the target webpage may be added into the short URL. When it is detected the mouse is moved over the short URL, the lookup procedure may be triggered to identify the social networking traffic information and introduction information of the target webpage. Then a display box 702 may be popped up by the side of the short URL to display the social networking traffic information and the introduction information of the target webpage. As shown in FIG. 7, displayed includes the title 721 of the target webpage, a summary 722 of the text, the long URL 723, the total visits in recent days 724, and the total visits from friends 725. The website logo 726 may also be displayed.

In addition, if introduction information of the target webpage is not submitted by the website nor stored, the introduction information of the target webpage corresponding to the short URL may be not found. In this case, various examples may use a webcrawler to visit the target webpage corresponding to the short URL and extract abstract information from the target webpage (e.g., webpage title, summary of text of the target webpage) as the introduction information of the target webpage. Then the extracted introduction information of the target webpage corresponding to the short URL may be displayed in the display box 702.

In an example, the social networking information of the target webpage may also include data on traffic, clicks, forwarding, complaints, or the like of the website providing the target webpage within the social networking platform besides the data on traffic, clicks, forwarding, complaints, or the like of the target webpage within the social networking platform. That is, in the example, the social networking traffic information may be gathered according to the two dimensions of the website and the webpage. Information about the website may enable visitors to know the influence of the website providing the target webpage in the social networking platform and increase the capabilities of visitors identifying safety levels of short URLs while information about the webpage may enable visitors to know the attention gained by the target webpage in the social networking platform. The social networking traffic information of the website providing the target webpage may be obtained from a conventional system. For example, a conventional microblog platform may provide a statistics server which calculates data on traffic, clicks, forwarding, complaints, or the like, of the website, and the social networking traffic information of the website may be directly obtained from the statistics server and then stored for use in subsequent procedures.

In the above procedures, after generating the short URL corresponding to the long URL, the mapping relation between the long URL and the short URL may be stored. After procedure S46, the process may also include: after detecting a second command triggered through the short URL, the long URL corresponding to the short URL may be obtained, and the target webpage corresponding to the long URL may be jumped to. Generally, if the terminal used by the user is a computer with a mouse, the second command may be a click event of a click on the short URL using the mouse. If the terminal used by the user is a portable terminal with a touch screen, the second command may be a touch event of a click or a double-click on the short URL by the user. In other examples, the second command may also be other specified operation commands.

In addition, after the second command triggered through the short URL is detected, if the website providing the target webpage corresponding to the short URL fails to pass the authentication, the complaint ratio of the website domain name may be checked. If the complaint ratio of the website domain name exceeds a specified threshold, prompt information may be presented to inform the user of the safety risks. Such safety alert may not be presented for a domain name that have passed real name authentication.

In an example, since the mapping relation between the long URL and the short URL may be stored in the above procedures, after receiving the long URL in procedure S42, it may first be checked whether the short URL corresponding to the long URL has been stored. If the short URL has been stored, the short URL may be directly obtained and the procedures S43 and S44 may be skipped. If the short URL is not stored, the procedures S43 and S44 may be performed.

In addition, since not all websites may submit and have respective authentication information stored, there may be situations in procedure S43 where authentication information of a website providing the target webpage corresponding to the long URL cannot be found. Thus, according to an example, if the authentication information is not found in procedure S43, the long URL may be converted into a short URL according to a conventional scheme and the procedure S44 may be skipped.

According to various examples, a short URL is generated to include authentication information, thereby a user can judge whether the website to be visited is reliable based on the short URL. When detailed information of a short URL is acquired, information associated with the website pointed to by the short URL, such as website brand, website introduction, social networking traffic to the website, or the like, is provided to the user so that the user can decide whether to visit the website. In addition, by exposing the website logo and website identifier, the target website can spread its brand information in the social networking platform, increase exposure of contents of the website. As such, various examples can bring more traffic to websites providing high-quality contents.

In a network system including foreground and background, the procedures of the above methods may include procedures that may be performed at the foreground and procedures that may be performed at the background. Various examples provide a method of presenting short URL performed at the foreground and a method of short URL feedback performed at the background.

Figure 8:
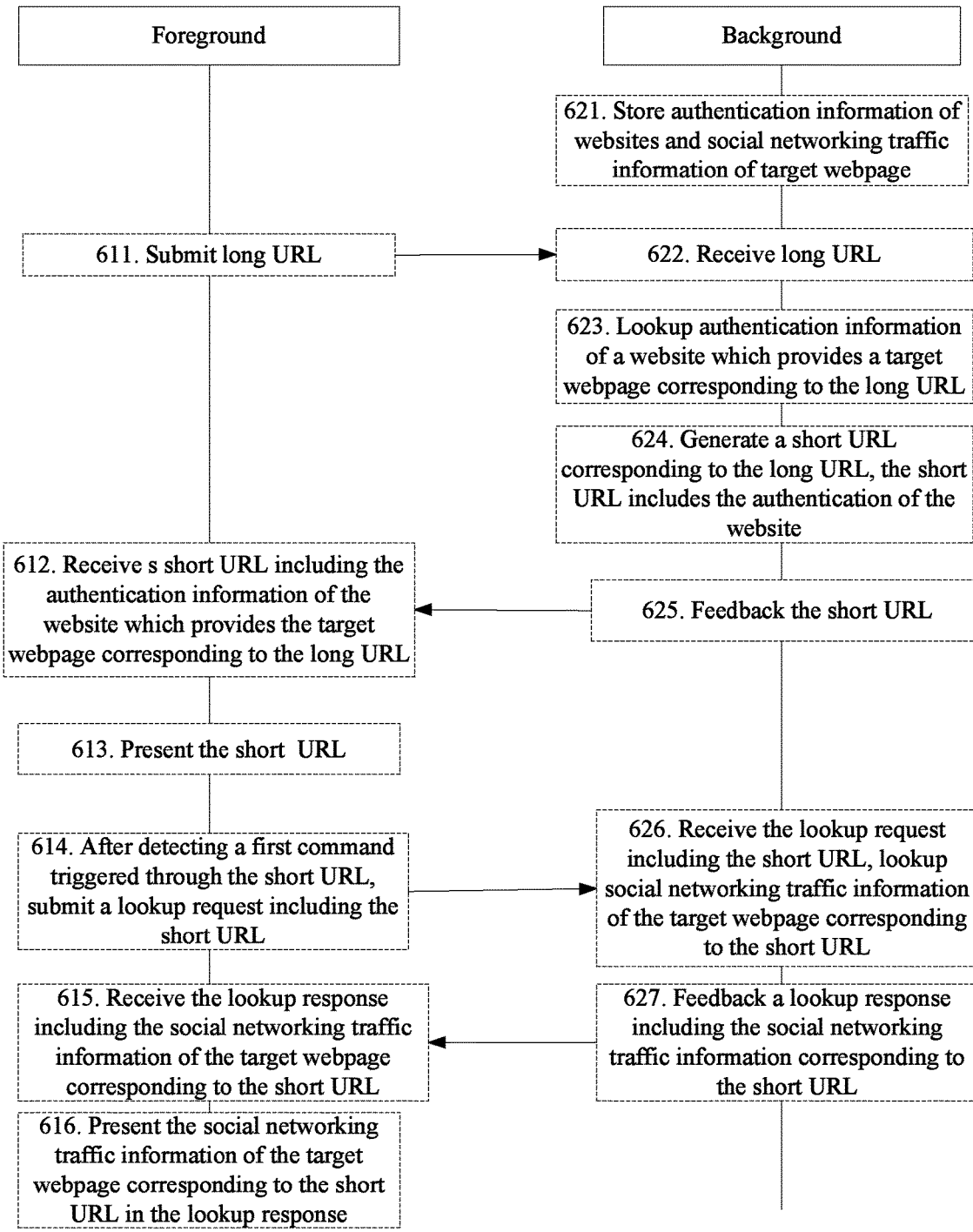
FIG. 8 is a flowchart illustrating a method of presenting a short URL and a corresponding method of responding in accordance with an example of the present disclosure.

FIG. 8 is a flowchart illustrating a method of presenting short URL and a corresponding method of short URL feedback in accordance with an example of the present disclosure. As shown in FIG. 8, at the foreground of a system, the method of presenting short URL may include the following procedures.

In procedure S811, a long URL may be submitted. For example, when a user sends a microblog, the user may input a regular URL of a target webpage, i.e., the long URL, if the user wants to put out the URL of the target webpage. For example, the user may generally paste a long URL into the page for submitting contents. After clicking on a button for submitting contents, contents of the microblog sent by the user may be submitted to the microblog system, and the system may receive the contents of the microblog which includes the long URL at the background.

In procedure S812, a short URL including authentication information of the website providing the target webpage corresponding to the long URL may be received.

This procedure may be triggered where only the short URL may be presented when a user browses a webpage including a URL. For example, when a user is browsing a microblog including a URL in a microblog system, only a short URL is presented due to the system has a word count requirement.

In procedure S813, the short URL may be presented. An example is as shown in FIGS. 5, 6 and 7.

In procedure S814, after detecting a first command triggered through the short URL, a lookup request including the short URL may be submitted.

In procedure S815, a lookup response including social networking traffic information of the target webpage corresponding to the short URL may be received.

In procedure S816, the social networking traffic information of the target webpage corresponding to the short URL in the lookup response may be presented. An example is as shown in FIGS. 5, 6 and 7.

At the background of the system, the method of short URL feedback may include the following procedures.

In procedure S821, authentication information of a website may be stored, and social networking traffic information of a target webpage may be stored.

In procedure S822, a long URL may be received. For example, a user may submit content of a microblog which includes a long URL to the background of the system through the foreground of the system, the background of the system may receive the long URL.

In procedure S823, authentication information of the website providing the target webpage corresponding to the long URL may be looked up.

In procedure S824, a short URL corresponding to the long URL may be generated, the short URL may include the authentication information of the website providing the target webpage corresponding to the long URL. After this procedure, the background of the system may store the microblog which includes the short URL, and feed back the microblog which includes the short URL in subsequent procedure S825 after the foreground of the system sends a browse request. The background may also store a mapping relation between the long URL and the short URL for subsequent lookup procedure for the long URL corresponding to the short URL in response to a second command triggered through the short URL sent by a user. After the lookup procedure, the background may make the webpage being browsed by the user jump to the target webpage corresponding to the long URL.

In procedure S825, the short URL may be fed back.

In procedure S826, a lookup request including a short URL may be received, and social networking traffic information of the target webpage corresponding to the short URL may be identified.

In procedure S827, a lookup response including the social networking traffic information of the target webpage corresponding to the short URL may be received.

The authentication information of a website may include at least one of the following: a website domain name, a website logo, a website identifier, a qualification certificate of the website, or the like.

The social networking traffic information of the target webpage may include at least one of: the number of visits to the target webpage from a social networking platform, the number of clicks, the number of forwarding, the number of complaints or the like of the target webpage within the social networking platform, the number of visits to the website providing the target webpage from a social networking platform, the number of clicks, the number of forwarding, the number of complaints or the like of the website within the social networking platform, or the like.

The presenting method performed at the foreground may also include: obtaining the long URL corresponding to the short URL after detecting a second command triggered through the short URL, and making the webpage jump to the target webpage corresponding to the long URL. The long URL may be fed back to the foreground together with the short URL in procedure S825. After detecting the second command triggered through the short URL, the foreground may lookup the background in real time. The background may identify the long URL corresponding to the short URL according to the mapping relation between the long URL and the short URL, and feed back the long URL to the foreground.

In an example, the feedback method performed at the background may also include: storing introduction information of the target webpage; identifying the introduction information of the target webpage corresponding to the short URL after receiving a lookup request including the short URL, and feeding back a lookup response which includes social networking traffic information and introduction information of the target webpage corresponding to the short URL.

In an example, the feedback method may include: visiting the target webpage corresponding to the short URL using a webcrawler if the introduction information of the target webpage cannot be found, extracting abstract information from the target webpage as the introduction information of the target webpage, and feeding back a lookup response including the social networking traffic information and the introduction information of the target webpage corresponding to the short URL.

Accordingly, in the presenting method performed at the foreground, the lookup response may also include the introduction information of the target webpage corresponding to the short URL. The presenting method may also have the introduction information of the target webpage in the lookup response presented, as shown in FIG. 7.

In various examples, the foreground of the system generally refers to a terminal capable of interacting with a user. The foreground may be implemented by a specially designed client, e.g., in a client/server (C/S) mode, or by a web browser capable of accessing a server, e.g., in a browser/server (B/S) mode. In view of the rapid development of the Internet technology, the architecture of the system may keep evolving. The basic mechanism and the functions of the present disclosure remains the same irregardless of the system architecture, and the differences of variations of the mechanism may lie in the position of the modules fulfilling the functions.

Figure 9:
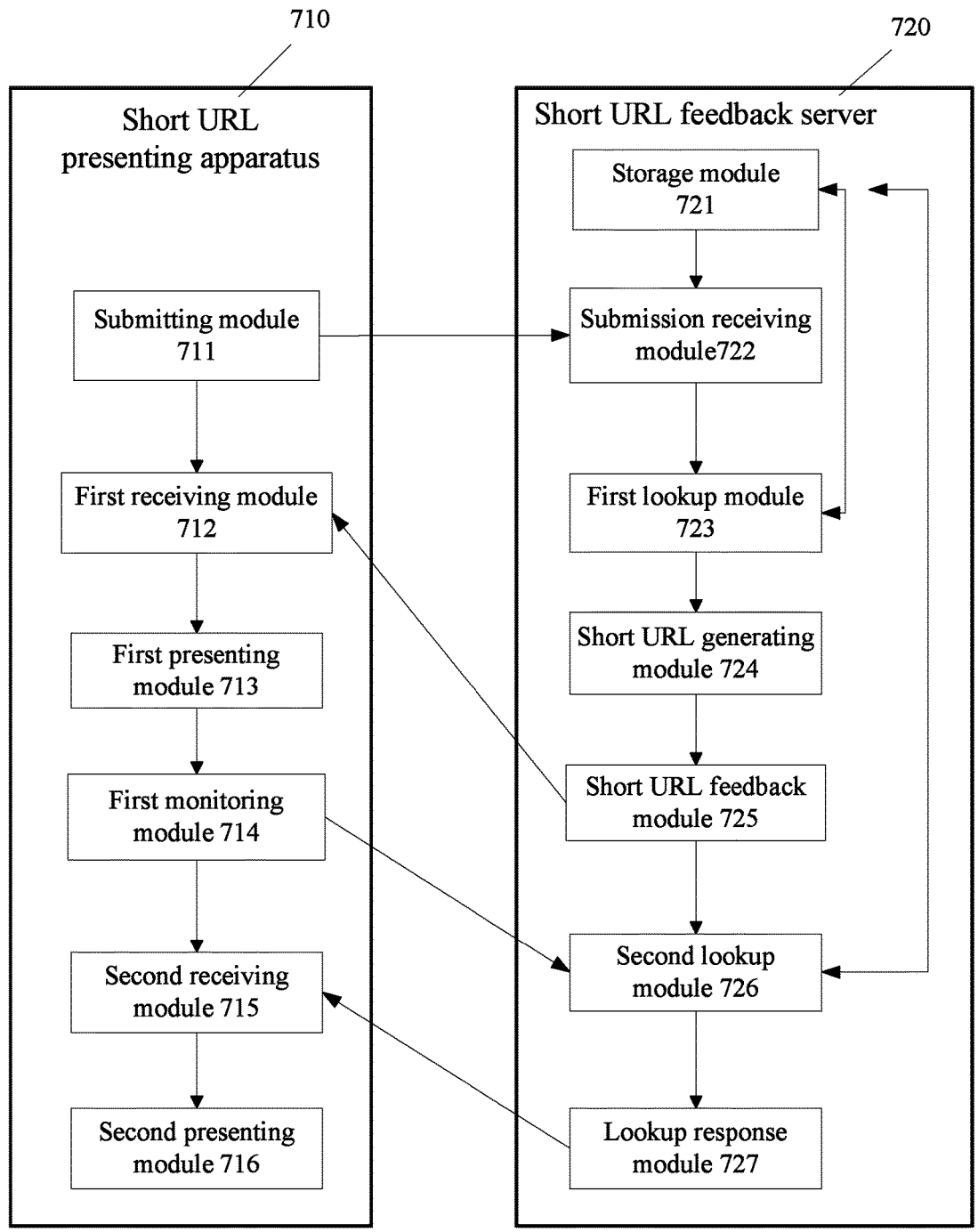
FIG. 9 is a schematic diagram illustrating a system of short URL presentation and feedback in accordance with an example of the present disclosure.

Corresponding to the above methods, various examples also provide an apparatus of presenting short URL which may be configured at the foreground of the system and a server of short URL feedback which may be configured at the background of the system. The apparatus of presenting short URL and the apparatus of short URL feedback may compose the system of short URL presentation and feedback. FIG. 9 is a schematic diagram illustrating a system of short URL presentation and feedback in accordance with an example of the present disclosure. As shown in FIG. 9, the apparatus of presenting short URL may include the following modules.

A submitting module 911 may submit a long URL.

A first receiving module 912 may receive a short URL including authentication information of a website providing a target webpage corresponding to the long URL.

A first presenting module 913 may present the short URL.

A first monitoring module 914 may monitor a first command triggered through the short URL, and submit a lookup request including the short URL after detecting the first command.

A second receiving module 915 may receive a lookup response including social networking traffic information of the target webpage corresponding to the short URL.

A second presenting module 916 may present the social networking traffic information of the target webpage corresponding to the short URL in the lookup response.

In an example, the presenting apparatus 910 may also include a second monitoring module.

The second monitoring module may monitor a second command triggered through the short URL, obtain a long URL corresponding to the short URL after detecting the second command, and jump to a target webpage corresponding to the long URL.

In an example, the lookup response may also include introduction information of the target webpage corresponding to the short URL. The second presenting module 916 may also present the introduction information in the lookup response.

The server of short URL feedback may include the following modules.

A storage module 921 may store authentication information of a website and social networking traffic information of a target webpage.

A submission receiving module 922 may receive the long URL.

A first lookup module 923 may look up authentication information of a website providing a target webpage corresponding to the long URL.

A short URL generating module 924 may generate a short URL corresponding to the long URL, the short URL may include the authentication information of the website providing the target webpage corresponding to the long URL.

A short URL feedback module 925 may feed back the short URL.

A second lookup module 926 may receive a lookup request including a short URL, and look up social networking traffic information of the target webpage corresponding to the short URL.

A lookup responding module 927 may feedback a lookup response including the social networking traffic information of the target webpage corresponding to the short URL.

In an example, the storage module 921 may store introduction information of the target webpage. The second lookup module 926 may look up the introduction information of the target webpage corresponding to the short URL after receiving the lookup request including the short URL. The lookup responding module 927 may feed back the lookup response which includes the social networking traffic information and the introduction information of the target webpage corresponding to the short URL.

In an example, the second lookup module 926 may obtain the introduction information of the target webpage by using a webcrawler to visit the target webpage corresponding to the short URL and extract abstract information from the target webpage as the introduction information when the introduction information of the target webpage is not found.

The method and system of various examples may be embedded into a third party website to enable the third party website to provide the functions of short URL presentation and feedback. The presented short URL includes an authentication mark representing the webpage has passed authentication of an authenticator. As such, the credibility of the third party website can be increased.

The modules of various examples may be integrated into one processing module, or may be standalone physical units. In other examples, two or multiple of the above modules may be integrated into one module. The integrated module may be implemented by hardware or software modules. The modules of various examples may be implemented in one terminal or network device, or may be implemented by plural terminals or network devices.

Various examples may be implemented by program codes executable by a data processing device, e.g., a computer. The program codes also form part of the present disclosure. Program codes stored in a storage medium may be executed by being read from the storage medium or being installed or copied into a storage device (e.g., a hard drive and/or memory) in a data process device. Thus, the storage medium is also part of the technical scheme. The storage medium may include paper storage medium (e.g., paper-tap and etc.), magnetic storage medium (e.g., floppy disk, hard drive, Flash card and etc.), optical storage medium (e.g., CD-ROM, and the like), magneto-optical storage medium (e.g., MO and the like) and so on.

A machine-readable storage medium is also provided, which is to store instructions to cause a machine to execute any of the embodiments as disclosed herein.

The foregoing are only preferred examples of the present disclosure and are not for use in limiting the protection scope thereof. All modifications, equivalent replacements or improvements in accordance with the spirit and principles of the present disclosure shall be included in the protection scope of the present disclosure.

The invention claimed is:

1. A method of short uniform resource locator (URL) lookup and feedback, comprising:
   receiving a request related to a short URL which is associated with a target URL;
   identifying resource information of the short URL which is descriptive of credibility of network resources pointed to by the target URL; and
   making the resource information provided to a user; wherein
   the resource information comprises: social networking traffic information including statistics obtained by a social networking platform based on traffic generated by users within the social networking platform to the network resources or to a website providing the network resources or based on feedback information related with the network resources or the website made by users of the social networking platform.

2. The method of claim 1, wherein
   the resource information further comprises: descriptive information of a website providing the network resources.

3. The method of claim 2, wherein the descriptive information of the website comprises at least one of: a name, a domain name, a type, a logo, text introduction, traffic statistics data, user statistics data.

4. The method of claim 1, wherein the social networking traffic information comprises at least one of: within a social networking platform, the amount of visits to the short URL, the amount of clicks on the short URL, the amount of forwarding of the short URL, the amount of likes of the short URL, the amount of the short URL being added to favorites, the amount of complaints regarding the short URL, the amount of visits to the website providing the network resources, the amount of clicks on the website, the amount of complaints regarding the website.

5. The method of claim 1, wherein the social networking traffic information comprises at least one of: among contacts of a user related with the request within a social networking platform, the amount of visits to the short URL, the amount of clicks on the short URL, the amount of forwarding of the short URL, the amount of likes of the short URL, the amount of the short URL being added to favorites, the amount of complaints regarding the short URL, the amount of visits to the website providing the network resources, the amount of clicks on the website, the amount of complaints regarding the website;
    wherein the request comprises an identity of the user in the social networking platform.

6. The method of claim 1, wherein
the resource information further comprises: an authentication result of authenticating the short URL performed by a web service provider, the authentication result indicates a result of reviewing credibility of the short URL by the web service provider.

7. The method of claim 1, wherein
the resource information further comprises: introduction information of the network resources, the introduction information comprises at least one of: a title, an abstract of content, a publication date, and information source.

8. The method of claim 7, further comprising:
visiting the webpage pointed to by the target URL using a webcrawler, and extracting abstract information from the webpage as the introduction information of the network resources.

9. The method of claim 1, further comprising:
receiving a second request related with a long URL;
identifying an identity of a website providing network resources pointed to by the long URL, the identity is a character string or a logo;
generating a second short URL which includes the identity; and
making the second short URL provided to a second user.

10. The method of claim 9, wherein generating the second short URL comprises:
using the character string as one of: a prefix of a domain name of the second short URL, a sub domain name of the second short URL, a directory name of the second short URL.

11. An apparatus of short uniform resource locator (URL) lookup and feedback, comprising:
    a storage module, for storing resource information corresponding to short URLs;
    a lookup module, for receiving a request related with a short URL which is associated with a target URL; identifying resource information of the short URL in the storage module, the resource information is descriptive of credibility of network resources pointed to by the target URL; and making the resource information provided to a user;
    wherein the resource information comprises social networking traffic information including statistics obtained by a social networking platform based on traffic generated by users within the social networking platform to the network resources or to a website providing the network resources or based on feedback information related with the network resources or the website made by users of the social networking platform.

12. The apparatus of claim 11, wherein
the resource information further comprises at least one of:
descriptive information of a website providing the network resources, or
an authentication result of authenticating the short URL performed by a social networking platform, the authentication result indicates a result of reviewing credibility of the short URL by the social networking platform, or
introduction information of the network resources, the introduction information comprises at least one of: a title, an abstract of content, a publication date, and information source.

13. The apparatus of claim 12, wherein the descriptive information of the website comprises at least one of: a name, a domain name, a type, a logo, text introduction, traffic statistics data, user statistics data.

14. The apparatus of claim 11, wherein the social networking traffic information comprises at least one of:
within a social networking platform, the amount of visits to the short URL, the amount of clicks on the short URL, the amount of forwarding of the short URL, the amount of likes of the short URL, the amount of the short URL being added to favorites, the amount of complaints regarding the short URL, the amount of visits to the website providing the network resources, the amount of clicks on the website, or the amount of complaints regarding the website, or
among contacts of a user related with the request within a social networking platform, the amount of visits to the short URL, the amount of clicks on the short URL, the amount of forwarding of the short URL, the amount of likes of the short URL, the amount of the short URL being added to favorites, the amount of complaints regarding the short URL, the amount of visits to a website providing the network resources, the amount of clicks on the website, or the amount of complaints regarding the website; wherein the request comprises an identity of the user in the social networking platform.

15. The apparatus of claim 12, wherein
the lookup module is for visiting the webpage pointed to by the target URL using a webcrawler, and extracting abstract information from the webpage as the introduction information of the network resources.

16. A non-transitory storage medium, storing computer-readable instructions capable of causing a computer to perform actions of:
    receiving a request related to a short URL which is associated with a target URL;
    identifying resource information of the short URL which is descriptive of credibility of network resources pointed to by the target URL; and
    making the resource information provided to a user;
    wherein the resource information comprises social networking traffic information including statistics obtained by a social networking platform based on traffic generated by users within the social networking platform to the network resources or to a website providing the network resources or based on feedback information related with the network resources or the website made by users of the social networking platform.

17. The non-transitory storage medium of claim 16, wherein
the resource information further comprises at least one of:
descriptive information of a website providing the network resources, or
an authentication result of the short URL obtained by a social networking platform, the authentication result indicates a result of reviewing credibility of the short URL by the social networking platform, or
introduction information of the network resources, the introduction information comprises at least one of: a title, an abstract of content, a publication date, and information source.

18. The non-transitory storage medium of claim 17, wherein the descriptive information of the website comprises at least one of: a name, a domain name, a type, a logo, text introduction, traffic statistics data, user statistics data.

19. The non-transitory storage medium of claim 16, wherein the social networking traffic information comprises at least one of:
- within a social networking platform, the amount of visits to the short URL, the amount of clicks on the short URL, the amount of forwarding of the short URL, the amount of likes of the short URL, the amount of the short URL being added to favorites, the amount of complaints regarding the short URL, the amount of visits to the website providing the network resources, the amount of clicks on the website, or the amount of complaints regarding the website, or
- among contacts of a user related with the request within a social networking platform, the amount of visits to the short URL, the amount of clicks on the short URL, the amount of forwarding of the short URL, the amount of likes of the short URL, the amount of the short URL being added to favorites, the amount of complaints regarding the short URL, the amount of visits to a website providing the network resources, the amount of clicks on the website, or the amount of complaints regarding the website;
- wherein the request comprises an identity of the user in the social networking platform.

* * * * *

UNITED STATES PATENT AND TRADEMARK OFFICE
CERTIFICATE OF CORRECTION

PATENT NO. : 9,680,911 B2  
APPLICATION NO. : 15/101589  
DATED : June 13, 2017  
INVENTOR(S) : Changwen Yuan Page 1 of 1

It is certified that error appears in the above-identified patent and that said Letters Patent is hereby corrected as shown below:

On the Title Page

Insert item:
--(73), Assignee:
Tencent Technology (Shenzhen) Company Limited
Shenzhen, Guangdong, People's Republic of China--

Signed and Sealed this
Tenth Day of April, 2018

Andrei Iancu
*Director of the United States Patent and Trademark Office*